No. 614,685. Patented Nov. 22, 1898.
J. W. YOUNG.
ORNAMENTAL BABY CARRIAGE.
(Application filed Mar. 11, 1898.)

(No Model.) 3 Sheets—Sheet 1.

Witnesses
Harry L. Amer.
C. H. Walker.

Inventor
John W. Young.
by V. S. Stockbridge
Attorney

THE NORRIS PETERS CO., PHOTO-LITHO., WASHINGTON, D. C.

No. 614,685. Patented Nov. 22, 1898.
J. W. YOUNG.
ORNAMENTAL BABY CARRIAGE.
(Application filed Mar. 11, 1898.)
(No Model.) 3 Sheets—Sheet 2.
FIG. 3.
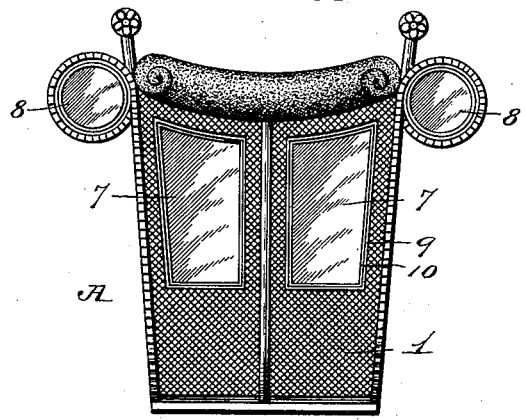
FIG. 4.
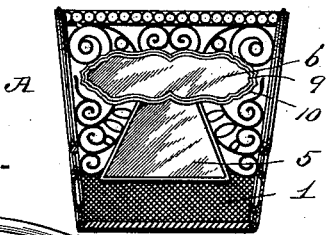
FIG. 5. FIG. 6.
 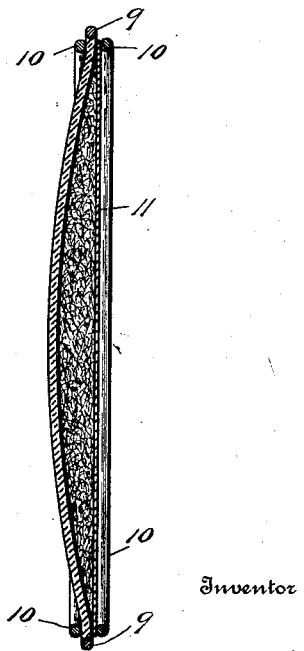
Witnesses
Harry L. Ames.
C. A. Walker.
Inventor
John W. Young.
by O. S. Stockbridge.
Attorney
THE NORRIS PETERS CO., PHOTO-LITHO., WASHINGTON, D. C.

No. 614,685. Patented Nov. 22, 1898.
J. W. YOUNG.
ORNAMENTAL BABY CARRIAGE.
(Application filed Mar. 11, 1898.)

(No Model.) 3 Sheets—Sheet 3.

Witnesses
Harry L. Ames.
C. A. Walker.

Inventor
John W. Young.
By V. T. Stockbridge
Attorney

THE NORRIS PETERS CO., PHOTO-LITHO., WASHINGTON, D. C.

UNITED STATES PATENT OFFICE.

JOHN W. YOUNG, OF ROCHESTER, PENNSYLVANIA.

ORNAMENTAL BABY-CARRIAGE.

SPECIFICATION forming part of Letters Patent No. 614,685, dated November 22, 1898.

Application filed March 11, 1898. Serial No. 673,519. (No model.)

*To all whom it may concern:*

Be it known that I, JOHN W. YOUNG, a citizen of the United States, residing at Rochester, in the county of Beaver and State of Pennsylvania, have invented certain new and useful Improvements in Ornamental Baby-Carriages; and I do hereby declare the following to be a full, clear, and exact description of the invention, such as will enable others skilled in the art to which it appertains to make and use the same.

My invention relates to baby-carriages.

The object of the invention is to provide a highly ornamental or luxurious carriage for infants.

The invention consists of a basket-work frame and body built up from willow, ratan, or the like, having glass or earthenware panels embraced and secured within and by the basket-frame.

The decoration of glass and chinaware by grinding the glass and by painting and firing the china are well-known arts, and the variations which may be made in such decorations are almost infinite. My invention contemplates the use of these substances as a part of the body of the baby-carriage, the same being embraced and supported by the basket-work constituting the framework of the carriage-body.

Figure 1:
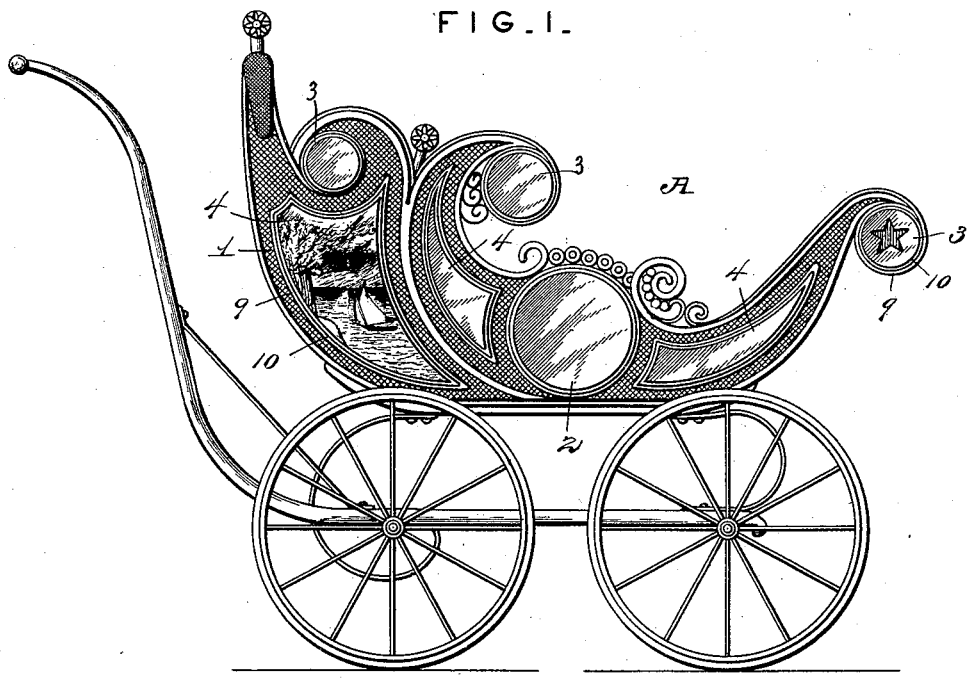
Figure 2:
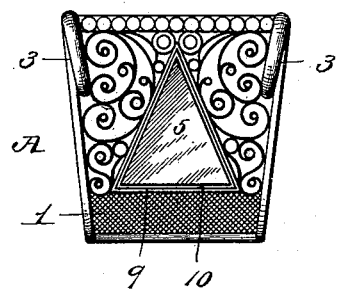
Figure 7:
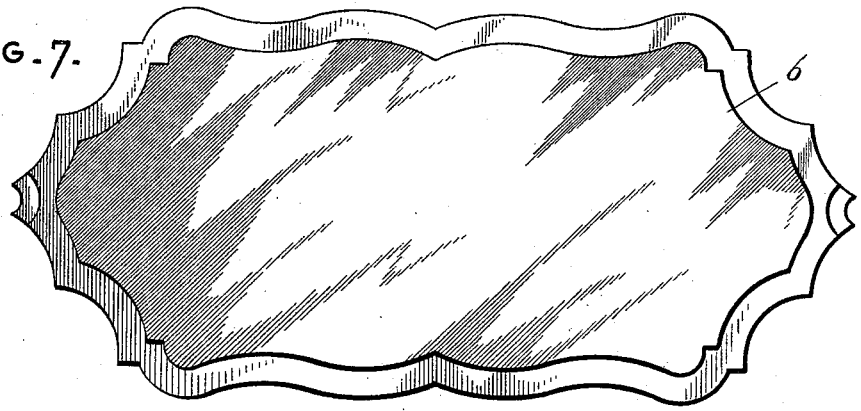
Figure 8:
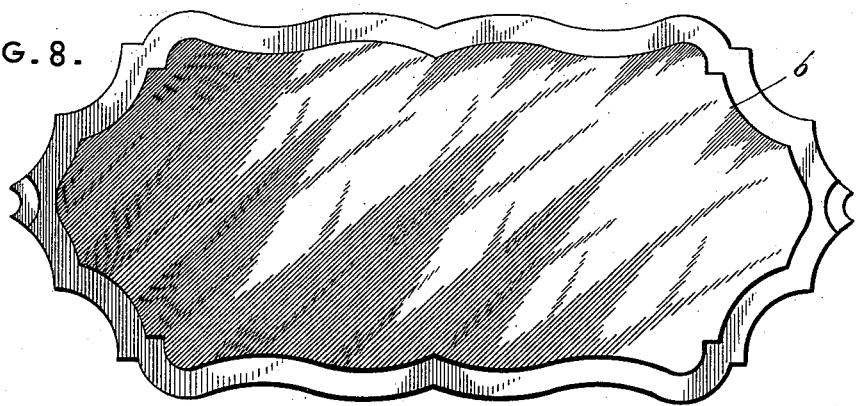
Figure 9:
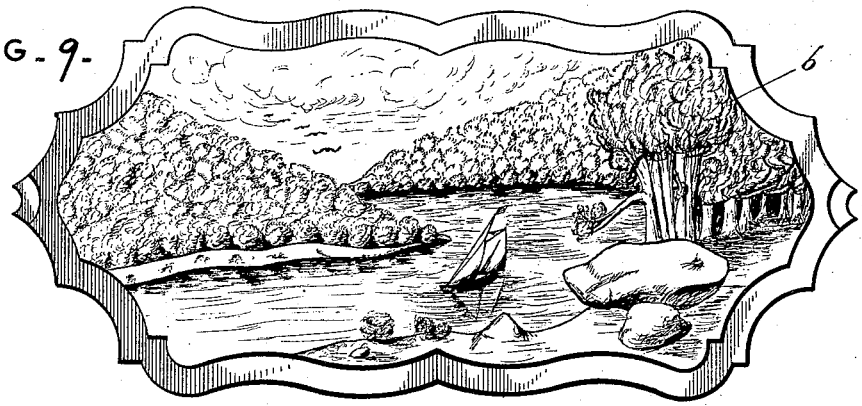
Figure 10:
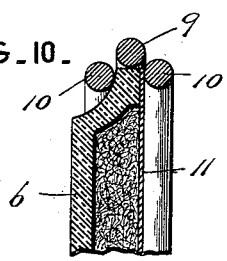

In the drawings, Figure 1 is a side elevation of one style of baby-carriage disclosing my invention. Fig. 2 is an elevation of the front or forward side of the dashboard of the carriage. Fig. 3 is an elevation of the rear part of the carriage. Fig. 4 is an elevation of the rear side of the dashboard as seen from within the carriage. Figs. 5 and 6 illustrate in elevation and section the method of sustaining and holding the plates or panels in the basket-frame. Figs. 7, 8, and 9 illustrate panels of different characters. For example, Fig. 7 shows a glass panel, Fig. 8 a panel silvered to constitute a mirror, and Fig. 9 a panel decorated with landscape. Fig. 10, like Fig. 6, is a detail section illustrating the method of holding the panel in position and of padding or upholstering the inside of the carriage.

Obviously glass panels may be ground and given any character or degree of finish that may be found desirable, and the panels may be of any suitable outline or contour; but they should be concavo-convex or dish shape with the convex side arranged outwardly, and in order to protect the panel from blows or shocks from within the carriage-body, as well as to render the carriage comfortable and luxurious, the inside of the carriage, and especially the inside of the panels, are padded and upholstered in any suitable or approved way, the upholstering or padding serving not only its usual function, but also that of protecting the frangible panels from destruction.

A is a baby-carriage or perambulator having a body consisting of basket-work 1 with a plurality of ornamental glass or porcelain panels, as shown.

2 is a large disk or shield. 3 3 3 are smaller disks or panels arranged in the scrollwork of the body, and 4 4 4 are triangular ornamental panels adapted to fit in the basket-frame, as shown.

The view shown in Fig. 2 discloses a triangular panel 5, which shows through to the inside of the carriage, as illustrated in Fig. 4, and this is intended to be silvered to produce a mirror on the inside. Above and over the panel 5 I have shown on the inside of the dashboard another oblong scalloped panel 6, as seen in Fig. 4.

As illustrated in Fig. 3, I have shown the back of the carriage with rectangular panels 7 7 and circular panels 8 8.

In Figs. 9 and 10 I have illustrated a panel decorated in any suitable way and have also shown the means of securing the panel in place and also of securing the upholstering fabric in place by means of the basket-work of the frame.

In practice in making my improved baby-carriage body I bend the willow or the ratan 9 into forms corresponding with the outline of the panels and leave it to set and incorporate said outline borders into the frame of the body. The panel is then inserted into position and basket-work or rods or strips of basket material 10 10 are formed on opposite sides of the edges of the panel and secured to the outline border 9, thereby securing the panels firmly in position. During this process the concaved or dished side of the panel is padded and upholstered, the covering fabric 11 being clamped between one of the strips or rods 10 and the face of the panel, as shown in Figs. 6 and 10.

Figs. 7, 8, and 9, as above indicated, illustrate oblong panels having scalloped or wavy edges of the character of that shown at 6 in Fig. 4. It should be understood that the style of the basket-work for the carriage-body may be varied to suit the taste of the builder, and the shape of the panels may also be modified to correspond with the changed character of the basket-frame, and the decorations may be altered and changed without limit.

Having described my invention, what I claim, and desire to secure by Letters Patent, is—

1. A baby-carriage body composed of basket-work having openings bordered by frames bent and incorporated with the body, glass or porcelain panels fitting in said frames, and wreaths or bands attached to the border on both sides of the panels, substantially as described.

2. A carriage-body composed of basket-work having openings bordered by frames bent and incorporated with the body, glass or porcelain panels having scalloped or wavy outlines, and wreaths or bands bent into shape and attached to the border on both sides of the panels corresponding with the contour of the outer edge of the panel, substantially as described.

3. A carriage-body composed of basket-work having openings bordered by frames bent and incorporated with the body, glass or porcelain panels having scalloped or wavy outlines, wreaths or bands bent to shape corresponding with the outlines of the panels attached to the border, and upholstering the fabric or the cover of which is secured in position by one of the wreaths or bands, substantially as described.

In testimony whereof I affix my signature in presence of two witnesses.

JOHN W. YOUNG.

Witnesses:
ROBT. E. JOHNSTON,
JOHN M. PFEIFFER.